(12) United States Patent
Liu et al.

(10) Patent No.: US 12,286,287 B2
(45) Date of Patent: Apr. 29, 2025

(54) AUTOMATIC FEEDING SYSTEM

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Eddy Liu, New Taipei (TW); Jun Yan, Zhengzhou (CN); Chih-Yuan Cheng, New Taipei (TW); Wei-Da Yang, New Taipei (TW); Jun Chen, Shenzhen (CN); Er-Wei Chen, Shenzhen (CN); Xiao-Ming Lv, Shenzhen (CN); Qi Feng, Zhengzhou (CN); Shu-Fa Jiang, Shenzhen (CN); Zhe-Qi Zhao, Zhengzhou (CN); Hsin-Ta Lin, New Taipei (TW); Han Yang, Shenzhen (CN); Jun-Hui Zhang, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

(*) Notice: Subject to any disclaimer, the term of this patent is extended or adjusted under 35 U.S.C. 154(b) by 747 days.

(21) Appl. No.: 17/506,492

(22) Filed: Oct. 20, 2021

(65) Prior Publication Data

US 2022/0119189 A1    Apr. 21, 2022

(30) Foreign Application Priority Data

Oct. 20, 2020    (CN) .......................... 202011126774.0

(51) Int. Cl.
 B65D 83/76 (2025.01)
 G01B 11/14 (2006.01)
 (Continued)

(52) U.S. Cl.
 CPC .............. B65D 83/76 (2025.01); G01B 11/14 (2013.01); G06K 7/1413 (2013.01);
 (Continued)

(58) Field of Classification Search
 CPC .. B65D 83/0005; G01B 11/14; G06K 7/1413; G06K 7/1417; G06K 19/06028;
 (Continued)

(56) References Cited

U.S. PATENT DOCUMENTS

| 7,151,455 B2 | 12/2006 | Lindsay |
| 2010/0012653 A1 | 1/2010 | Ulrich |

(Continued)

FOREIGN PATENT DOCUMENTS

| CN | 208326578 U | 1/2019 |
| EP | 2559836 A2 | 2/2013 |

(Continued)

*Primary Examiner* — Christopher W Carter
(74) *Attorney, Agent, or Firm* — ScienBiziP, P.C.

(57) ABSTRACT

A receiving structure providing real-time information as to the materials constituting its contents includes a box body, a first side plate, and a second side plate. The box body, the first side plate, and the second side plate forming a receiving space, and the receiving space receives materials. A discharge port is formed between the second side plate and the first side plate, the discharge port is in communication with the receiving space, and the discharge port is configured to take out the material. A material checking unit is provided on the first side plate, the material checking unit detects and enables real time identification of the materials in the receiving structure.

9 Claims, 5 Drawing Sheets

(51) Int. Cl.
  *G06K 7/14*      (2006.01)
  *G06K 19/06*     (2006.01)
(52) U.S. Cl.
  CPC ..... *G06K 7/1417* (2013.01); *G06K 19/06028*
           (2013.01); *G06K 19/06037* (2013.01)
(58) Field of Classification Search
  CPC ... G06K 19/06037; G07F 9/06; G07F 19/209;
           G07F 9/026; G07G 1/0027; B65G 47/74;
           B65G 43/08; B65G 47/82; B65G 47/90;
           B65G 47/91; B65B 69/00
  See application file for complete search history.

(56) References Cited

U.S. PATENT DOCUMENTS

| | | | |
|---|---|---|---|
| 2013/0106607 A1 | 5/2013 | Clement | |
| 2013/0134178 A1* | 5/2013 | Lu | G07F 9/026 |
| | | | 221/92 |
| 2015/0278790 A1* | 10/2015 | Jain | G06Q 20/203 |
| | | | 705/22 |
| 2017/0301173 A1* | 10/2017 | Hindsgaul | G07F 9/026 |
| 2019/0108483 A1* | 4/2019 | Tineo | G07F 9/026 |

FOREIGN PATENT DOCUMENTS

| | | |
|---|---|---|
| JP | H05105277 A | 4/1993 |
| JP | H0797081 A | 4/1995 |
| JP | 2004015037 A | 1/2004 |
| JP | 3175602 U | 5/2012 |
| JP | 2017202283 A | 11/2017 |
| TW | 200303740 A | 9/2003 |
| WO | 2019227127 A1 | 12/2019 |

* cited by examiner

AUTOMATIC FEEDING SYSTEM

FIELD

The subject matter herein generally relates to an automatic feeding system.

BACKGROUND

During production, manufacturing, and transportation of products, receiving structures are needed to package raw materials of the product or a finished product.

The receiving structure may currently be a closed packaging box. The user needs to manually open the packaging box to take out the raw materials. The quantity and type of materials or products in the packaging box cannot be known until the box is opened, thus limiting the application of such packaging box in unmanned factories.

BRIEF DESCRIPTION OF THE DRAWINGS

Implementations of the present technology will now be described, by way of example only, with reference to the attached figures.

DETAILED DESCRIPTION

Figure 1:
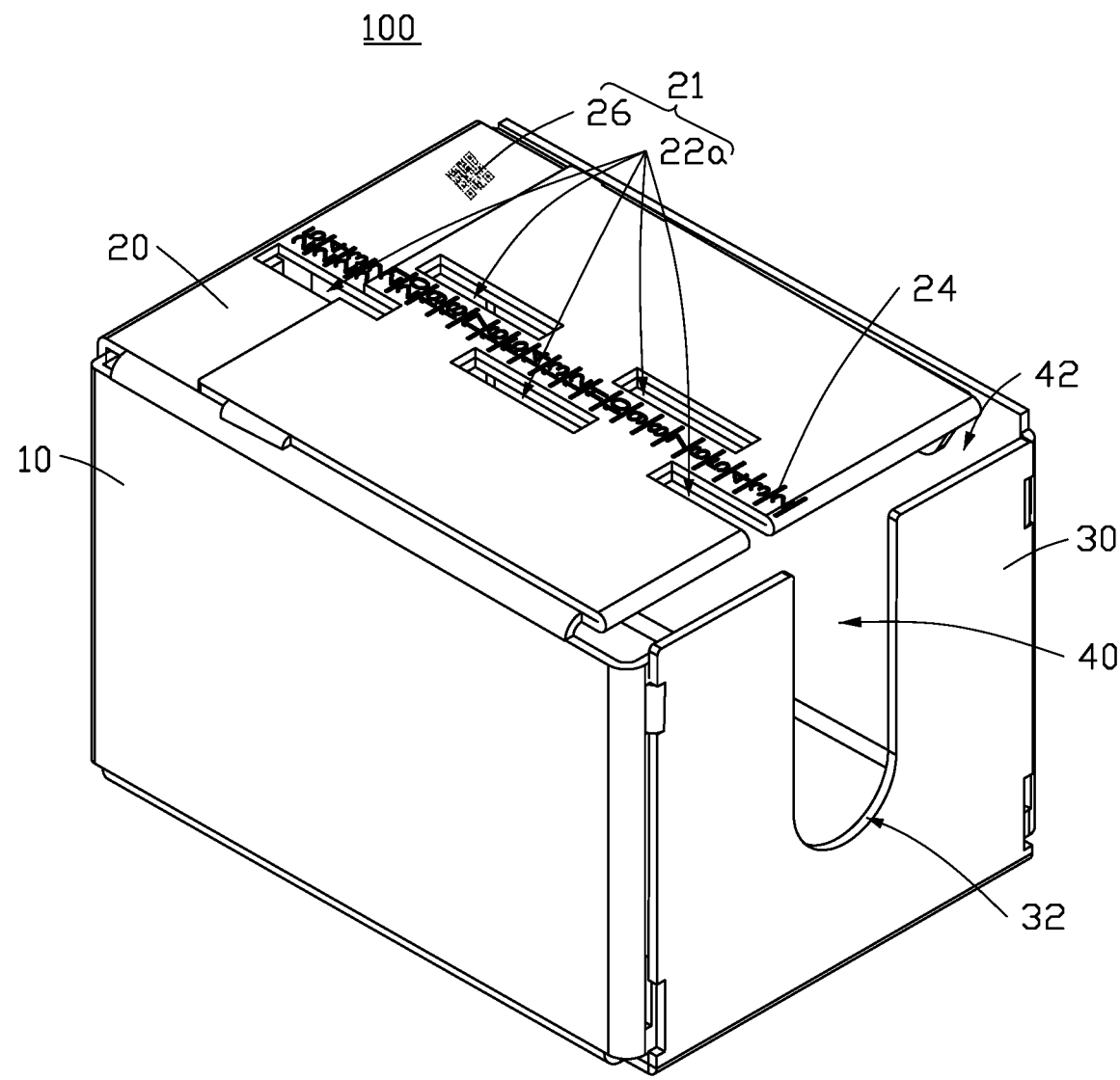
FIG. 1 is a diagrammatic view of an embodiment of a receiving structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the embodiments and features in the embodiments can be combined with each other.

Referring to FIG. 1, an embodiment of a receiving structure 100 is provided for storing materials 300. The receiving structure 100 includes a box body 10, a first side plate 20, and a second side plate 30. The first side plate 20 and the second side plate 30 are connected to the box body 10 to form a receiving space 40. A discharge port 42 is formed between the first side plate 20 and the second side plate 30. The discharge port 42 is in communication with the receiving space 40. The receiving structure 100 further includes a material checking unit 21, which detects a position and a quantity of the materials 300 in the receiving structure 100.

Figure 2:
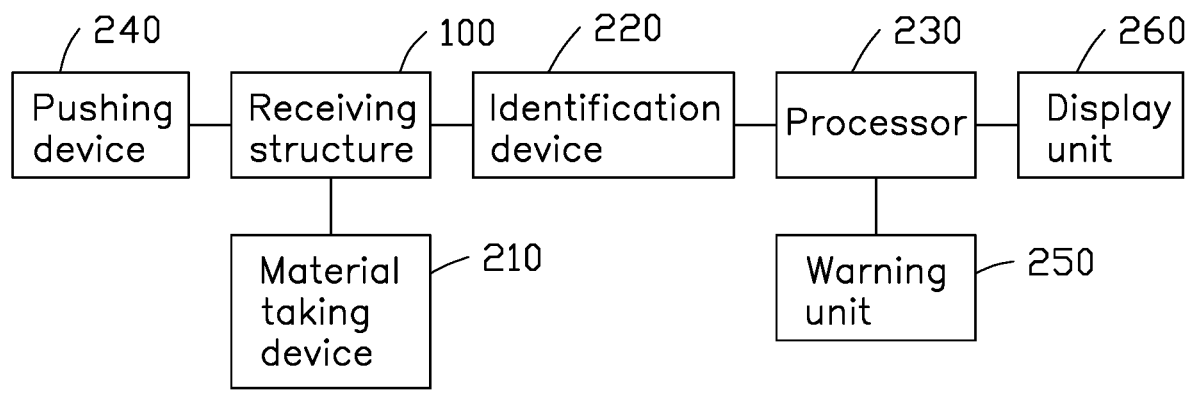
FIG. 2 is a block diagram of an embodiment of an automatic feeding system.

Referring to FIG. 2, an embodiment of an automatic feeding system 200 is also provided. The automatic feeding system 200 includes the receiving structure 100, a material taking device 210, an identification device 220, and a processor 230. The material taking device 210 is disposed at the discharge port 42 of the receiving structure 100. The material taking device 210 can take the materials 300 out of the receiving structure 100. The material taking device 210 can be connected with the processor 230 to control the material taking device 210 to perform corresponding actions. The processor 230 is connected to the identification device 220 through electrical connection, communication connection, etc. The identification device 220 obtains a real-time status of the receiving structure 100 through the material checking unit 21 on the receiving structure 100 and transmits the real-time status to the processor 230. The processor 230 obtains the position and the quantity of the materials 300 in the receiving structure 100 accordingly.

The materials 300 can be but are not limited to electronic products, raw materials, food bags, packing box, etc. The receiving structure 100 can be applied in storehouses, food industries, factories, and the like. The materials 300 have a fixed shape. That is, when the receiving structure 100 stores one kind of material (for example, mobile phones or trays), each of the materials 300 has a fixed size. In one embodiment, the materials 300 are trays.

The receiving structure 100 can be made of, but is not limited to, at least one of metal (such as aluminum, stainless steel), wood, paper, cloth, and polymer materials (such as PP, PE), which can be selected according to a shape of the materials 300 and/or an ambient environment.

A shape of the receiving structure 100 is not limited. The shape of the receiving structure 100 can be made according to the shape of the materials 300 and/or the ambient environment. For example, the receiving structure 100 can be in a shape of a rectangular parallelepiped, a cube, a hollow column, and the like.

In some embodiments, the receiving structure 100 is substantially in a shape of a rectangular parallelepiped. The first side plate 20 and the second side plate 30 are adjacent surfaces of the rectangular parallelepiped. The box body 10 is formed by surfaces of the rectangular parallelepiped other than the first side plate 20 and the second side plate 30. The box body 10, the first side plate 20, and the second side plate 30 are enclosed to form the receiving structure 100. The first side plate 20 and the second side plate 30 have a certain angle therebetween and are spaced apart to form the discharge port 42. In some embodiments, the first side plate 20 and the second side plate 30 are perpendicular to each other. The discharge port 42 allows the material taking device 210 to grab the materials 300 through the discharge port 42 and take the materials 300 out from the discharge port 42. The material taking device 210 includes, but is not limited to, a robot arm, a suction cup, a clamping jaw, a hook, and the like.

The discharge port 42 is disposed on a surface of the first side plate 20 facing the second side plate 30. A size of the discharge port 42 matches a size of the materials 300 to be stored in the receiving structure 100, so that the materials 300 can be freely taken out from the discharge port 42.

Figure 3:
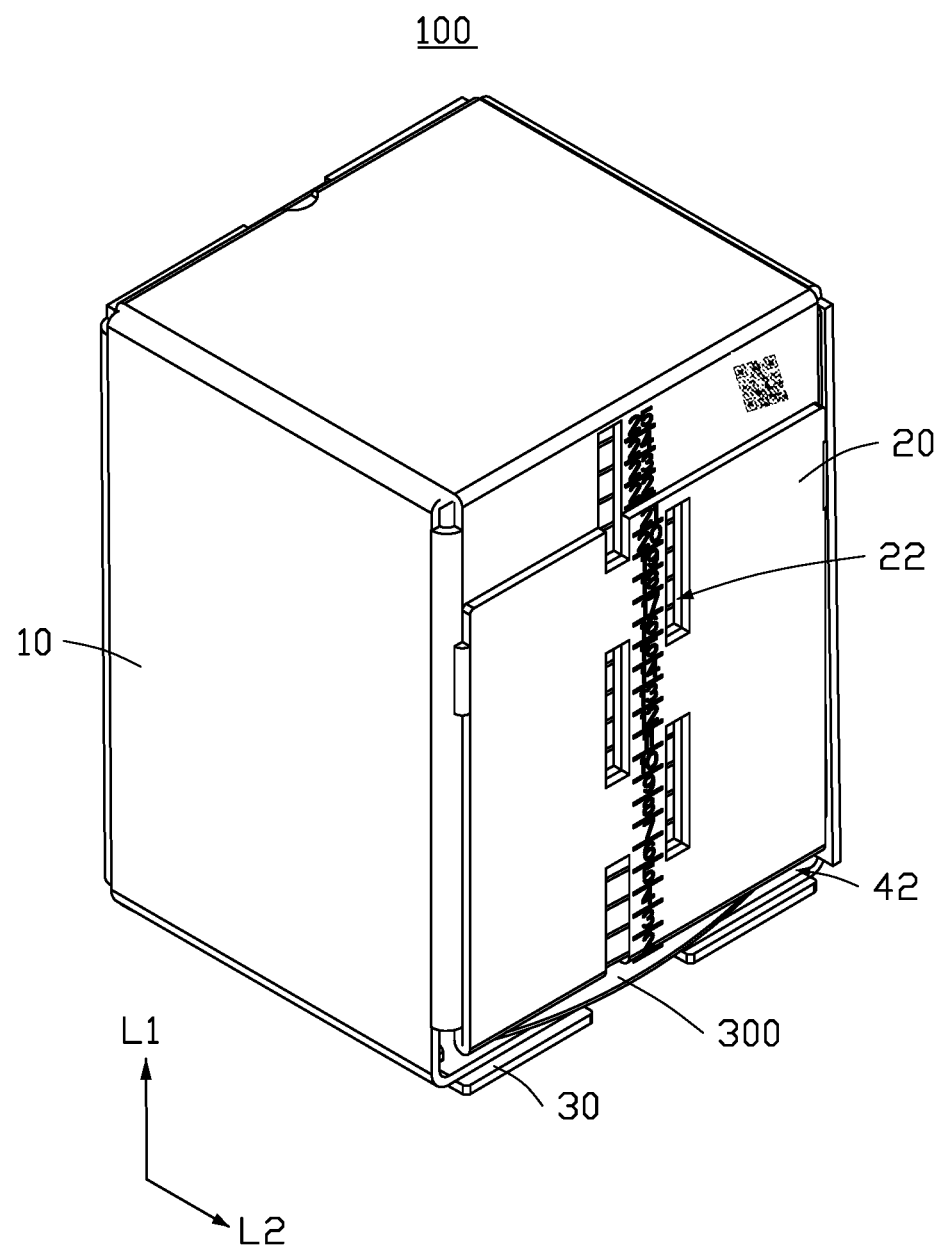
FIG. 3 is similar to FIG. 1 but showing the receiving structure from another angle.

Referring to FIG. 3, a direction perpendicular to the second side plate 30 is defined as a first direction L1, and a direction parallel to the second side plate 30 and perpendicular to the first direction L1 is defined as a second direction L2. Multiple materials 300 are included, which are disposed along the first direction L1. When the materials 300 are disposed in the receiving structure 100, along the first direction L1, each material 300 includes a first width D1, and the discharge port 42 includes a second width D2. The first width D1 and the second width D2 satisfy a relation of D1<D2<2D1, that is, the second width is greater than the first width and less than twice of the first width, so that only one material 300 can be taken out of the receiving structure 100 each time. Along the second direction L2, a length of the discharge port 42 is greater than a length of the material 300.

In some embodiments, the second side plate 30 includes a material taking recess 32, and the material taking recess 32 is recessed along the second side plate 30 away from the discharge port 42. The material taking recess 32 is in communication with the receiving space 40 and the discharge port 42. The material taking recess 32 may be a groove or a through hole. The material taking device 210 can pass through the material taking recess 32 and through the material 300 disposed at the discharge port 42, and then automatically take the material 300 out of the material taking recess 32 and the discharge port 42.

Along the direction parallel to the second side plate 30, an area of the material taking recess 32 is smaller than an area of the material 300, so that the material 300 can be disposed in the receiving structure 100 and supported on the second side plate 30 and prevented from collapsing.

Referring to FIG. 3 again, in some embodiments, when the receiving structure 100 is in use, along a direction of gravity, the second side plate 30 is disposed at the bottom of the receiving structure 100, that is, the second side plate 30 is perpendicular to the direction of gravity. When one material 300 disposed at the discharge port 42 is taken out, the exit of other materials 300 is prevented due to the limitation of the size of the discharge port 42. The remaining materials 300 move down automatically under the action of gravity.

Figure 4:
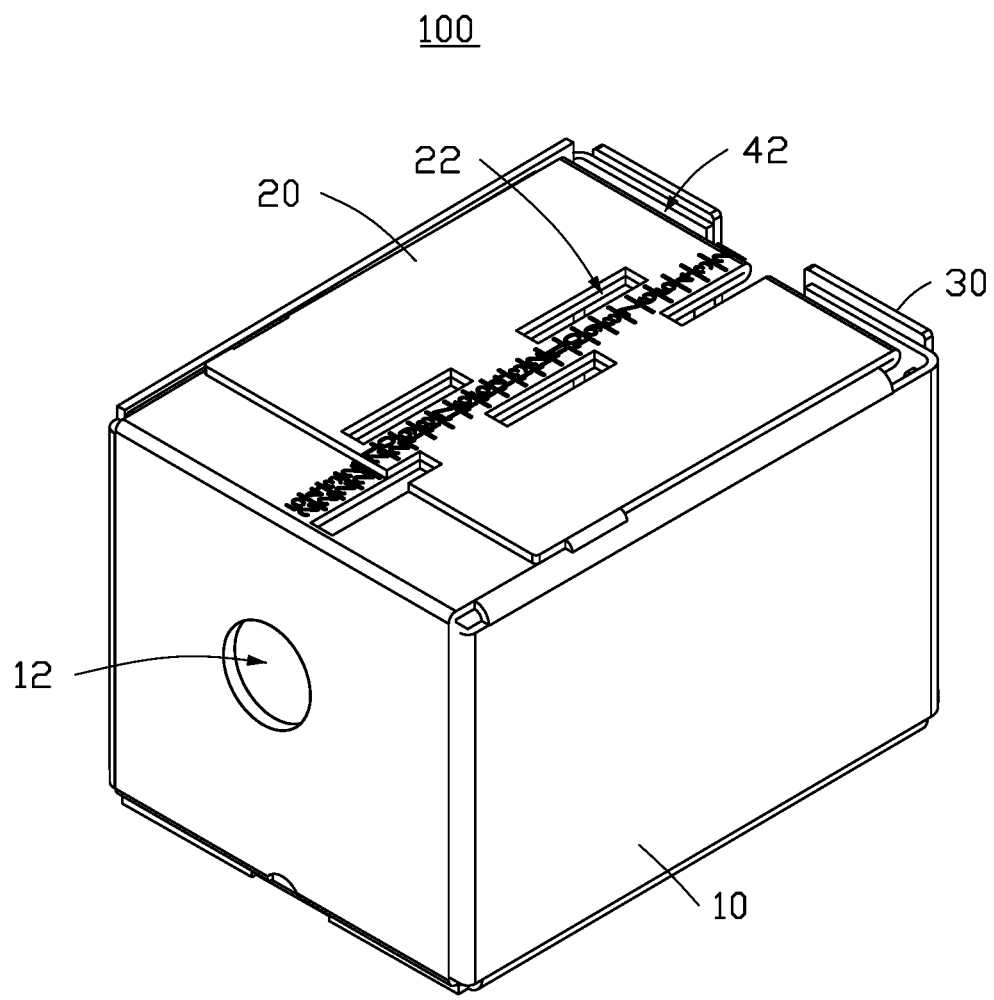
FIG. 4 is a diagrammatic view of another embodiment of a receiving structure.

Referring to FIG. 2 and FIG. 4, in some embodiments, the automatic feeding system 200 further includes a pushing device 240. The receiving structure 100 includes an opening 12 at one end away from the second side plate 30. The pushing device 240 can pass through the opening 12 and bear against one material 300 away from the second side plate 30. The pushing device 240 is used to push the materials 300 in the receiving structure 100. After the material 300 disposed at the discharge port 42 is taken out, the pushing device 240 pushes the remaining materials 300 in the first direction L1 toward the second side plate 30, causing the materials 300 to abut the second side plate 30.

The material checking unit 21 may be at least one of a viewing port 22 or a first identification code 26. When the material checking unit 21 includes the first identification code 26, the identification device 220 is needed to scan the first identification code 26. The first identification code 26 includes, but is not limited to, a barcode, a two-dimensional code, an electronic label, and the like. The material checking unit 21 can detect the quantity of the remaining materials 300 in the receiving structure 100 in real time and feedback information as to the quantity.

In an embodiment, the material checking unit 21 includes the viewing port 22. The viewing port 22 is disposed on the receiving structure 100 along the first direction L1. The viewing port 22 is connected with the receiving space 40, so that the user can physically see the quantity and the position of the materials 300 in the receiving structure 100, so that the user can replace the receiving structure 100, or replace or supplement materials 300 with replacements or additions, etc. The viewing port 22 is disposed on the surface of the first side plate 20 along the first direction L1. In other embodiments, the viewing port 22 can be disposed on the surface of the box body 10, except for the surface opposite to the second side plate 30.

The viewing port 22 may be only one port or a plurality of sub-viewing ports 22a formed alternately. In an embodiment, the viewing port 22 is formed by a staggered plurality of sub-viewing ports 22a. Thus, the structural strength of the first side plate 20 is maintained.

In some embodiments, a transparent material (not shown) covers the viewing port 22. The transparent material can prevent external contaminants (such as dust) from entering the receiving structure 100 through the viewing port 22.

In order to allow the user to conveniently observe the quantity of the materials 300 in the receiving structure 100 through the viewing port 22, a peripheral edge of the viewing port 22 may also be provided with an identification unit 24.

The identification unit 24 includes at least one of scale marks, second identification codes, and serial numbers. The scale marks, the second identification codes, or the serial numbers are uniformly disposed along the first direction L1. A width of each the scale marks, the second identification codes, or the serial numbers is equal to the first width D1 of each material 300, so that the user can recognize the materials 300 in the receiving structure 100. In an embodiment, the identification unit 24 includes scale marks and serial numbers, and the serial numbers are disposed on a periphery of the scale marks. The second identification code includes, but is not limited to, barcode, two-dimensional code, electronic tag, etc. The serial numbers may be in a form of numbers, letters, colors, and texts. For example, the serial numbers may be in a form of "1, 2, 3, 4 . . . ", "A, B, C, D . . . ", "a, b, c, d . . . ", "I, II, III, IV . . . ", " A, B, C, D . . . ", or "red, orange, yellow, green . . . ". The numbers of the serial numbers or other characters progress in a sequence from a side close to the discharge port 42 to other side away from the discharge port 42. The first number of the progression of serial numbers is disposed at the discharge port 42.

The processor 230 can be a central processing unit (CPU), a microprocessor, a computer, or other data processing device. The identification device 220 transmits to the processor 230 identification information of the materials 300 corresponding to adjacent identification units 24 in the viewing port 22. The processor 230 determines the quantity of the materials 300 according to a difference of the materials 300 corresponding to the adjacent identification units 24.

In an embodiment, the identification device 220 can visually identify the identification information of the materials 300. The identification device 220 can be a camera (such as a CCD camera), which can capture images of the receiving structure 100 containing the materials 300 and transmit the images to the processor 230. The processor 230 recognizes the positions and the quantity of the materials 300 in the receiving structure 100. The quantity of the materials 300 is determined according to the presence or absence of materials 300 corresponding to the adjacent identification units 24.

Figure 5:
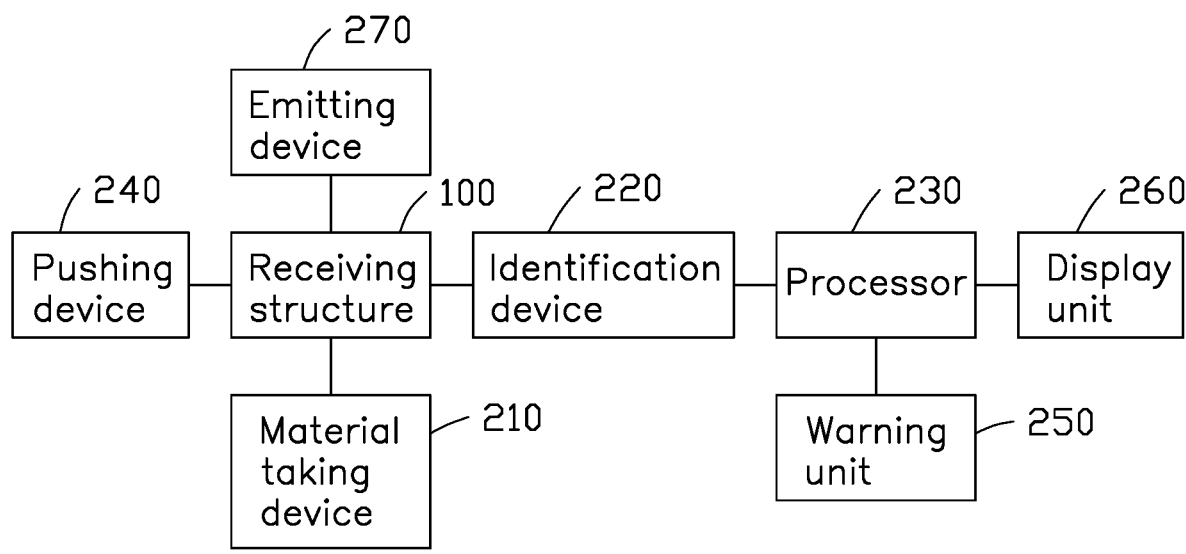
FIG. 5 is a block diagram of another embodiment of an automatic feeding system.

In some embodiments, the identification device 220 can also identify the materials 300 by distance detection. For example, the identification device 220 can use infrared beam or laser beam to detect distance and transmit the detected distance to the processor 230. The position and the quantity of the materials 300 in the receiving structure 100 can be determined according to the detected distance. Referring to FIG. 5, the receiving structure 100 further includes an emitting device 270, the emitting device 270 is disposed above the viewing port 22. The emitting device 270 can emit the infrared beam or the laser beam toward the viewing port 22. The distance when materials 300 are present and the distance when there are no materials 300 are different.

In some embodiments, the emitting device 270 can also be installed at an end of the receiving structure 100 away from the second side plate 30. The emitting device 270 emits the infrared beam or laser beam toward the materials 300, and the processor 230 determines the position and the quantity of the materials 300 according to the distance from the emitting device 270 to the materials 300.

In some embodiments, the material checking unit 21 is a combination of the first identification code 26 and the viewing port 22. The first identification code 26 can be disposed on an outer surface of the receiving structure 100. The processor 230 calculates the position and the quantity of the materials 300 in the receiving structure 100 and transmits such information to the first identification code 26 in real time. When the information in the first identification code 26 is read, the position and the quantity of the materials 300 in the receiving structure 100 can also be obtained in real time.

In some embodiments, the material checking unit 21 can be the first identification code 26. A third identification code may also be provided on a visible surface of each material 300. The third identification code includes at least one of a barcode, a two-dimensional code, and an electronic label. In a single embodiment, the first identification code and the third identification code can be the same or can be different.

After each material 300 is taken out of the receiving structure 100, the information stored in the third identification code will change, the processor 230 obtains the changed identification information in the third identification code, then the processor 230 obtains the changed information in the third identification code, so as to obtain the position and the quantity of the materials 300 in the receiving structure 100 in real time. The information, such as the position and the quantity of the materials 300 of the receiving structure 100, is changed in the first identification code 26. When the material checking unit 21 is the first identification code 26, the identification device 220 also can identify the information of the materials 300 by distance detection, and then the processor 230 can calculate the position and the quantity of the materials 300 in the receiving structure 100.

The automatic feeding system 200 further can include a warning unit 250. The warning unit 250 can generate an alarm, such as a sound alarm, a light alarm, and a communication alarm. The warning unit 250 is connected to the processor 230 through an electrical connection or a communication connection. The warning unit 250 can be disposed on the receiving structure 100 or on other components. When the quantity of the materials 300 in the receiving structure 100 are less than a preset threshold, the warning unit 250 can issue an alarm.

The automatic feeding system 200 further includes a display unit 260 connected to the processor 230, and the display unit 260 can display collected information as to the materials 300.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An automatic feeding system, comprising:
    a receiving structure comprising:
        a box body;
        a first side plate connected to the box body; and
        a second side plate connected to the box body; the box body, the first side plate, and the second side plate forming a receiving space, and the receiving space configured to receiving materials, a discharge port formed between the second side plate and the first side plate, the discharge port being in communication with the receiving space; the receiving structure further comprising a material checking unit disposed on the first side plate, the material checking unit comprising a viewing port, the material checking unit configured to detect the materials in the receiving structure;
    a material taking device comprising one of a robot arm, a suction cup, a clamping jaw, and a hook, the material taking device configured to take materials disposed at the discharge port out of the receiving structure;
    an identification device comprising a camera or an emitting device, the identification device configured to obtain an identification information of the materials in the receiving structure through the material checking unit, the identification information related to a position and a quantity of the materials in the receiving structure; and
    wherein a direction perpendicular to the second side plate is defined as a first direction, the viewing port is disposed on the box body and along the first direction, and the viewing port is in communication with the receiving space; the identification device is configured to obtain the identification information of the materials in the receiving structure, and the materials disposed at the viewing port is further related to the position and the quantity of the materials in the receiving structure.

2. The automatic feeding system of claim 1, wherein the viewing port comprises only one port or a plurality of sub-viewing ports, and the plurality of sub-viewing ports are disposed in a staggered manner along the first direction.

3. The automatic feeding system of claim 2, wherein an identification unit is disposed on a periphery of the viewing port.

4. The automatic feeding system of claim 3, wherein the identification unit comprises at least one of scale marks, second identification codes, and serial numbers, the scale marks, the second identification codes, or the serial numbers are uniformly disposed along the first direction.

5. The automatic feeding system of claim 4, wherein the second identification code comprises at least one of a barcode, a two-dimensional code, and an electronic label.

6. The automatic feeding system of claim 4, wherein the serial numbers comprise at least one of numbers, letters, colors, and characters.

7. The automatic feeding system of claim 2, wherein the identification device identifies the identification information by at least one of visual identification and distance detection.

8. The automatic feeding system of claim 7, wherein the emitting device emits an infrared beam or laser beam toward the materials; the distance detection comprises detecting a distance between the emitting device and the materials by the infrared beams or the laser beams.

9. The automatic feeding system of claim 2, wherein an opening is disposed on the receiving structure and faces away from the second side plate, and the opening is communicated with the receiving space; the automatic feeding system further comprises a pushing device passing through the opening and resisting against one of the materials away from the second side plate, the pushing device is configured to push the materials toward the second side plate to cause the materials to resist against the second side plate.

* * * * *